United States Patent [19]

Mosher

[11] Patent Number: 4,603,274

[45] Date of Patent: Jul. 29, 1986

[54] PRECISION WOUND ROTOR AND METHOD OF WINDING

[75] Inventor: Philip C. Mosher, Rockford, Ill.

[73] Assignee: Sundstrand Corporation, Rockford, Ill.

[21] Appl. No.: 568,536

[22] Filed: Jan. 5, 1984

[51] Int. Cl.$^4$ ............................................. H02K 3/46
[52] U.S. Cl. ..................................... 310/270; 310/45; 310/179; 310/194; 310/214
[58] Field of Search ............... 310/270, 198, 261, 179, 310/264, 265, 214, 215, 43, 45, 194, 216, 218, 269, 208; 336/197, 198, 208

[56] References Cited

U.S. PATENT DOCUMENTS

| | | | |
|---|---|---|---|
| 2,894,157 | 7/1959 | Morrill | 310/194 |
| 3,189,857 | 6/1965 | Jones | 336/208 |
| 3,334,255 | 8/1967 | Peters | 310/214 |
| 3,821,568 | 6/1974 | Gillet | 310/214 |
| 4,432,135 | 2/1984 | Greenlee | 310/214 |
| 4,454,492 | 6/1984 | Thackray | 336/208 |

FOREIGN PATENT DOCUMENTS 0228028 10/1958 Australia ............................. 310/214
0831440  3/1960 United Kingdom ................ 310/269

Primary Examiner—R. Skudy
Attorney, Agent, or Firm—Wood, Dalton, Phillips, Mason & Rowe

[57] ABSTRACT

According to the invention, an insulator is provided at the axial ends of a rotor core. The insulator has radially spaced rows of notches at intervals approximately equal to the diameter of the winding wire for guiding placement of the turns of the winding at a predetermined location. After completion of the first turn, the wire is skewed at a first angle with respect to the plane of the first turn to coincide with the second notch and the remainder of turns in the first layer in turn completed in substantially parallel relationship. At the completion of the last turn of the first layer, the wire is crossed over the next to the last turn, skewing the winding in an opposite direction and situating the wire in the valleys formed between the successive turns in the first layer. The sequence continues alternately for the remaining layers.

3 Claims, 7 Drawing Figures

PRECISION WOUND ROTOR AND METHOD OF WINDING

BACKGROUND OF THE INVENTION

1. Field of the Invention

This invention relates to a high speed machine rotor and, more particularly, to a structure facilitating precision machine winding of the rotor and a method of producing the same.

2. Background Art

Manufacturers of high speed generator rotors strive towards winding the rotor uniformly, rigidly and compactly so that a lightweight and balanced structure results. Often the rotor is hand wound. Inconsistent tension on and placement of hand wound turns is inevitable. As a result, the completed rotors may vary in shape and weight from one to the other. With the turns loosely wound, the available space is not efficiently utilized. Further, because the final shape of the hand wound rotor is unpredictable, the rotor encasement must be made large enough to handle the more loosely wound, and therefore larger, rotors. This accommodation, added to the installation clearances, makes the encasement substantially larger than desirable. The weight, amount of material required and the attendant manufacturing costs of the rotor are thereby proportionately increased. The electrical resistance of the coil is also increased with a loosely wound rotor.

An additional drawback with the hand wound prior art structures is that the field windings may shift on the core. The first, base layer is maintained on the core primarily by frictional forces developed by the combined effect of the tension on the wire and the pressure from progressively developed layers. This shifting and the weight imbalance resulting from loosely wound turns combine to cause detrimental centrifugal effects.

Rotors prewound by machine present many of the same problems associated with hand winding. The uniformity of the winding pattern and thus the predictability of the final rotor dimension cannot be assured. Further, clearance must be provided with the completed winding to allow placement over the rotor core, and adds to the size of the rotor. The resulting structure has numerous other of the drawbacks of the hand wound rotor, namely a lack of balance and a greater weight than is desirable. A still further drawback with prewound rotors is the requirement of additional manufacturing steps. The rotor winding must be removed from a drum or the like and mounted fixedly on the rotor core.

The present invention is specifically directed to overcoming the problems enumerated above.

SUMMARY OF THE INVENTION

According to the invention, an insulator is provided at the axial ends of the rotor core. The insulator has radially spaced rows of notches at intervals approximately equal to the diameter of the winding wire for guiding the turns of the winding to a predetermined location. After completion of the first turn, the wire is skewed at a first angle with respect to the plane of the first turn to coincide with the second notch and the remainder of turns in the first layer in turn completed in substantially parallel planes. At the completion of the last turn of the first layer, the wire is crossed over the next to the last turn, skewing the winding in an opposite direction and situating the wire in the valleys formed between the successive turns in the first layer. The sequence continues alternately for the remaining layers.

A rotor made according to the invention can be precisely machine wound in place and is predictably compact in size and accordingly light in weight. Because the size of the rotor can be predetermined, the encasement therefor can be closely dimensioned.

Further, the integrity of the rotor is enhanced. The notched insulator forms a firm foundation for the first layer and prohibits sliding of the turns on the core. Successive layers are crisscrossed and interlocked and progressively increase pressure on the underlying layers.

Another object of the invention is to define a regular path for cooling oil which can be introduced, under pressure, at one end of the coil.

DETAILED DESCRIPTION OF THE DRAWINGS

Figures 1, 2, 3, 4, 5, 6, 7:
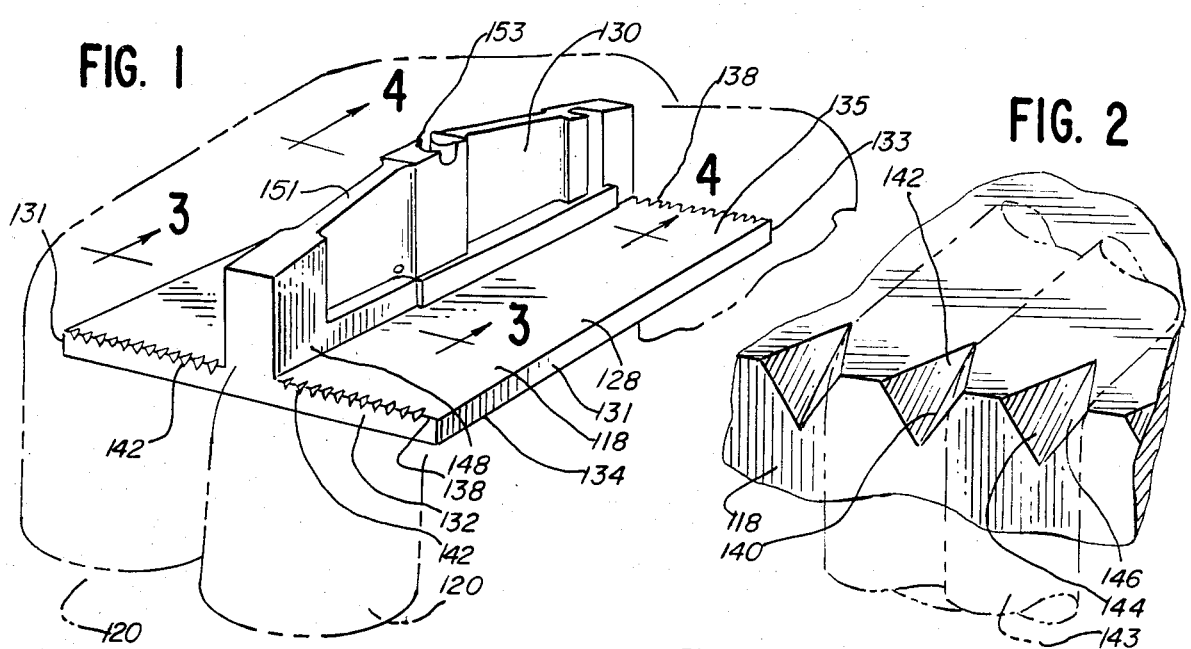
FIG. 1 is a perspective view of a notched insulator at the end of the rotor core according to the present invention.
FIG. 2 is an enlarged, fragmentary perspective view of the notches formed in the insulator of FIG. 1 for guiding placement of the field windings.
FIG. 3 is a sectional view of the wound rotor taken along line 3—3 of FIG. 1.
FIG. 4 is a sectional view of the wound rotor taken along line 4—4 of FIG. 1.
FIG. 5 depicts a base layer on a cylindrical member wound according to the present invention.
FIG. 6 depicts a second layer wound upon the first layer in FIG. 5 according to the present invention.
FIG. 7 is an exploded perspective view of a rotor suitable for in place field winding according to the present invention.

A rotor is illustrated a 110 in FIG. 7 and is exemplary of a structure which is suitable for precision field winding according to the present invention. The main core assembly 112 comprises an I-shaped core 114 laminated or otherwise suitably constructed from magnetic material. At each axial end of the core 114 is an end turn support 116 nominally matched to the cross section of the core and an insulator 118, which is detailed in FIGS. 1 and 2. With the field windings 120 completed a wedge 122 having an M-shaped cross section is attached to the core assembly 112, as by bolting. Rectangular pathways 124 are defined by flanges 126 to accommodate the windings 120. The wedge 122 is assembled to prevent distortion of the windings 120 from centrifugal forces in operation and is absent during the winding operation.

Each insulator 18, as seen most clearly in FIGS. 1 and 2, comprises a flat, rectangular base 128 having oppositely facing surfaces 134, 135 with an integral dividing wall 130 at right angles to the plane of the base 128. The wall 130 is parallel to and midway between the longer edges 131 of the base and meets flushly with the shorter edges 132, 133. The base surface 134 facially engages a recessed surface 129 of the end turn support 116 and is secured thereto as by adhesive. The completed windings also serve to retain the insulator firmly in place. The edges 132, 133 align substantially flushly with the oppositely facing recessed walls 136 (FIG. 7) of the core 114.

At the corners 138 where the flat base surface 35 meets the edges 132, 133, a plurality of uniformly configured wedge-shaped notches 42 are provided. The notches, as seen in FIGS. 1 and 2, are each defined by angled, triangular shaped surfaces 144, 146 which define a V cross section with a depth progressively diminishing from the corners 138 towards the center of the base 128. The maximum seating depth of each notch should be less than one half the diameter of the winding wire for reasons that will be apparent as the formation of additional layers is described. Because the windings 120 are symmetrical about the wall 130, and the insulators are identical at each end of the core, discussion will be limited to field winding on one representative side as illustrated in FIGS. 3 and 4 and at one core end.

The apexes 140 of the notches 142 are spaced uniformly from each other along the corners 138 with the spacing between apexes of successive notches approximately equal to the diameter of the winding wire 143. The turns of the first layer are therefore compactly wound.

Preferably, the spacing between the wall 130 and the apex 140 of the notch 142 closest to the wall is equal to one half the diameter of the wire 143 in the field windings 120 so that the peripheral surface of the wire 143 makes point contact simultaneously with the notch surfaces 144, 146 and the face 148 of the wall 130.

The first turn 1, with each successive turn numbered consecutively in FIG. 3, is initiated adjacent the wall midway between the edges 132, 133. The first turn of wire, illustrated in FIGS. 1, 3 and 5, extends over the edge 132 on the base 128 and core (not shown in FIGS. 1, 3 and 5) and opposite base (not shown) in counterclockwise fashion in FIG. 1 and is returned and guided in the first notch adjacent the wall on the opposite edge 133 with the first turn completed midway between the edges 132, 133 at the starting point. The wire is then skewed at an angle with respect to the plane of the first turn to coincide with the second notch and the operation repeated until the first layer, represented by turns 1-12, is completed. The windings of the first layer are disposed about a cylindrical member 150 in FIG. 5 to simplify illustration. The cylindrical member 150 is not part of the rotor 110. As seen in FIG. 5, each of the turns in the first layer after the first turn reside substantially in parallel planes.

The last turn 12 of the first layer crosses over the next to last turn, skewing the winding at an opposite angle $\theta$ (FIG. 6) to the angle $\theta$ of the first layer. The second layer of wire, which is identified by numbers 13-23 in FIG. 3, resides in the valleys 152 between wires in the first layer about a portion of each turn with the turns in the second layer arranged in substantially parallel planes. This sequence continues alternately for the seven remaining layers with turns 24-93 layers. The second layer provides valleys for the third layer and so on. From FIG. 4 it can be seen at crossover that the non-meshing layers occupy substantially more space in a longitudinal direction. Accordingly, the upper edge 51 of the wall in FIG. 1 tapers and peaks at the point of overlap at 153 conforming to the axial extent of the windings on the core.

The layers are precisely and compactly guided by the notches and valleys so that void formation is minimized. The crisscrossing layers positively keep the lower layers in place in the notches and/or valleys and thereby prevent shifting of the layers relative to each other and/or the core. The crisscrossing combines with the holding force in the wire as a result of the tension applied thereto to positively locate and secure the windings.

It can be seen that the rotor is wound in place so that no clearance need be provided for assembly with the rotor core as required with a prewound coil. The wire is guided by the notches and valleys in such a manner that precise, predictable machine winding can be accomplished. Thus uniform tension can be applied to the winding wire, resulting in a rotor of predictable dimension. For example a two pole 90KVA 400 Hz.A.C. generator requires 93 turns of #16 wire in each of two coils wound in series. The minimum required space can be accurately predetermined.

Because the turns in each layer are parallel, there is a regular oil path defined by any four adjacent wires. The oil passages are uniform which provide for predictable and repeatable oil flow and pressure drop characteristics. With the rotor in a final, assembled state, the windings are enclosed so that the cooling oil is confined radially and must continue an axial path. The cooling oil is guided out of and collected at the end of the rotor remote from the point of introduction.

I claim:

1. A precision wound rotor comprising:
   a magnetic core with axially spaced ends and an insulator at each core end;
   a plurality of spaced notches in each insulator having a maximum seating depth less than the diameter of a winding wire; and
   a plurality of layers of turns of wire extending around the core and over each of the insulators at the core ends, said plurality of layers of turns including first and second turn layers,
   wherein a portion of the wire in each turn of a plurality of turns of said first turn layer is located in a plurality of notches in said insulators and thereby substantially fixed against shifting relative to the core and each turn defines a valley with the next adjacent turn in the first turn layer which valley has a width less than the diameter of the wire,
   a portion of the wire of each turn of a plurality of turns of said second layer residing in the valleys so as to maintain the first and second layers fixedly relative to each other.

2. A precision wound rotor according to claim 1 wherein said notches have a substantially V-shaped cross section and are spaced equidistantly in rows and the spacing between the apexes of the V is substantially equal to the diameter of the wire so that the turns in each layer are compactly wound.

3. A precision wound rotor according to claim 1 wherein a wedge is attached to the magnetic core over a portion of a plurality of said turns of wire and prevents distortion from centrifugal forces in operation.

* * * * *